United States Patent [19]

Nakazato

[11] Patent Number: 5,592,575
[45] Date of Patent: Jan. 7, 1997

[54] APPARATUS FOR RECORDING IMAGE SIGNAL CONTROLLABLE IN TWO MODES OF OPERATION

[75] Inventor: Saburo Nakazato, Yokohama, Japan

[73] Assignee: Canon Kabushiki Kaisha, Tokyo, Japan

[21] Appl. No.: 72,968

[22] Filed: Jun. 8, 1993

[30] Foreign Application Priority Data

Jun. 30, 1992 [JP] Japan ................................ 4-196295

[51] Int. Cl.⁶ .................................................. G06K 9/60
[52] U.S. Cl. ........................ 382/312; 348/231; 358/909.1
[58] Field of Search ................................ 382/41, 58, 65, 382/68, 162, 312, 321; 395/131; 348/220, 18, 64, 231, 232, 237, 334; 358/909.1, 518, 524; H04N 1/21

[56] References Cited

U.S. PATENT DOCUMENTS

| | | | |
|---|---|---|---|
| 4,839,719 | 6/1989 | Hirota et al. | 358/75 |
| 5,122,873 | 6/1992 | Golin | 358/133 |
| 5,227,863 | 7/1993 | Bilbrey et al. | 358/22 |
| 5,258,859 | 11/1993 | Wada et al. | 358/487 |
| 5,335,097 | 8/1994 | Murakami | 358/520 |
| 5,442,717 | 8/1995 | Murakami | 382/162 |

FOREIGN PATENT DOCUMENTS 0405491  1/1991  European Pat. Off. ......... H04N 1/21

*Primary Examiner*—Andrew Johns
*Attorney, Agent, or Firm*—Fitzpatrick, Cella, Harper & Scinto

[57] ABSTRACT

An image signal processor for processing an image signal corresponding to an object image. An object is imaged to form an object image, and a plurality of pixel signals corresponding to the object image are input. A brightness signal and color-difference signals are formed by using the input pixel signals, and the pixel signals or the formed brightness and color-difference signals are stored. Also, brightness and color-difference signals are formed by using the pixel signals corresponding to the object image or the stored pixel signals. The brightness and color-difference signals formed from the input pixel signals or the stored brightness and color-difference signals are output. The apparatus is thus simply arranged to be capable of forming a frame image signal.

6 Claims, 16 Drawing Sheets

APPARATUS FOR RECORDING IMAGE SIGNAL CONTROLLABLE IN TWO MODES OF OPERATION

BACKGROUND OF THE INVENTION

1. Field of the Invention

This invention relates to an apparatus for recording an image signal on a recording medium.

2. Description of the Related Art

With the recent progress of recording techniques, video movie cameras in which a video camera and a video tape recorder are combined have been developed as an image signal recording apparatus-capable of recording a digital sound signal along with a moving image signal. In this kind of recording apparatus, a digital still image signal stored in a memory can be recorded on a recording medium such as a magnetic tape simultaneously with the picture taking and recording of a moving image signal by utilizing a recording medium portion for a digital sound signal.

Electronic still cameras capable of recording an optical image of an object by converting the image into an electrical signal are known as another kind of image signal recording apparatus. The size of an image pickup surface of such electronic still cameras is about 13 mm along a diagonal line in the case of a ½ inch charge coupled device (CCD) sensor, while the corresponding size of silver salt cameras using 35 mm film is about 45 mm, and the view angle of the former is ¼ that of the latter. Electronic still cameras can be used more easily and conveniently to record or reproduce images in comparison with silver salt cameras and therefore have come into use, for example, in the building industry for the purpose of taking pictures of circumstances of building sites and in the real-estate business for the purpose of making pictures for use in advertising, presentations and the like.

A still image signal can be recorded comparatively easily with respect to a unit corresponding to a field by using a video movie camera on the basis of a still image signal digital recording method such as that mentioned above, if a brightness signal and two color difference-signals output from an image pickup processing circuit of a video camera section are stored in a memory. In the case of recording a still image signal with respect to a unit corresponding to a frame, only a still image signal obtained by imaging a stationary object can be recorded; a still image signal obtained by imaging a moving object results in a blurred still image.

The size of the imaging surface of CCD sensors used in electronic still cameras is smaller than that of the ordinary imaging surface of silver salt cameras. Therefore, a picture taking lens having a shorter focal length is required, if a view angle wider than that for a portrait photography is required to express, for example, the relationship between a particular working place and the overall circumstances (in the case of the building industry), or an interior design, an overall view of an object or the relationship between an object and an adjacent building (in the case of the real estate business). For example, to obtain the same view angle as with a picture taking lens having a focal length of 20 mm in a silver salt camera, it is necessary for an electronic still camera to have a picture taking lens with a focal length of about 5 mm. In this case, there results a problem of an increase in manufacturing cost or a limitation on reducing the overall size of the camera. Recently, CCD sensors having an imaging surface diagonal line length of ⅓ inch have come into use and, therefore, this problem has become more serious.

Moreover, the number of pixels of image pickup devices for use in electronic still cameras is for some purposes not sufficiently large, and there is, therefore, a problem in terms of image quality if a short focal length lens is used in a camera mainly designed for portrait photography.

SUMMARY OF THE INVENTION

An object of the present invention is to provide an image signal processor free from the above-described problems.

Another object of the present invention is to provide an image processor capable of forming a frame image and having a simple arrangement.

Still another object of the present invention is to provide an image signal processor capable of forming and outputting a digital image frame signal and having a simple arrangement.

A further object of the present invention is to provide an image signal processor capable of forming an image signal corresponding to a wide-angle image area and having a simple arrangement.

To achieve these objects, according to one aspect of the invention, there is provided an image signal processor for processing an image signal corresponding to an object image, comprising an image pickup device having a plurality of pixels and capable of forming an image of the object, converting the image of the object into a plurality of pixel signals corresponding to the plurality of pixels, and outputting the pixel signals, pixel signal processing means capable of being supplied with the pixel signals, forming a brightness signal and a color-difference signal by using the supplied pixel signals, and outputting the brightness and color-difference signals, memory means for storing one of the group of the pixel signals output from the image pickup device and the group of the brightness signal and the color-difference signal output from the pixel signal processing means, supply means for supplying one of the group of the pixel signals output from the image pickup device and the group of the pixel signals stored in the memory means to the pixel signal processing means, and output means for outputting one of the group of the brightness signal and the color-difference signal output from the pixel signal processing means and the group of the brightness signal and the color-difference signal stored in the memory means.

According to another aspect of the present invention, there is provided an image signal processor for processing an image signal corresponding to an object image, comprising an image pickup device having a plurality of pixels and capable of forming an image of the object, converting the image of the object into a plurality of pixel signals corresponding to the plurality of pixels, and outputting the pixel signals, analog/digital conversion means capable of being supplied with the pixel signals output from the image pickup device, forming pixel data by analog/digital conversion of the supplied pixel signals, and outputting the pixel data, pixel data processing means capable of being supplied with the pixel signals, forming brightness data and color-difference data by using the supplied pixel signals, and outputting the brightness and color-difference data, memory means for storing one of the group of the pixel data output from the analog/digital conversion means and the group of the brightness data and the color-difference data output from the pixel data processing means, data supply means for supplying one of the group of the pixel data outputted from the analog/digital conversion means and the group of the pixel data stored in the memory means to the pixel data processing means, and output means for outputting one of the group of the brightness data and the color-difference data outputted from the pixel data processing means and the group of the brightness data and the color-difference data stored in the memory means.

According to still another aspect of the present invention, there is provided an image signal processor for processing an image signal corresponding to an object image, comprising an image pickup means for forming an image of an object, converting the image of the object into an image signal, and outputting the image signal, compression means for compressing the image signal output from the image pickup means and outputting the compressed image signal, if a wide-angle image frame having an area greater than that of the frame of the object image formed by the image pickup means is to be imaged, and memory means for storing the compressed image signal outputted from the compression means.

These and other objects and features of the present invention will become apparent from the following detailed description of the preferred embodiments of the invention taken in conjunction with the accompanying drawings.

DESCRIPTION OF THE PREFERRED EMBODIMENTS

Figure 1:
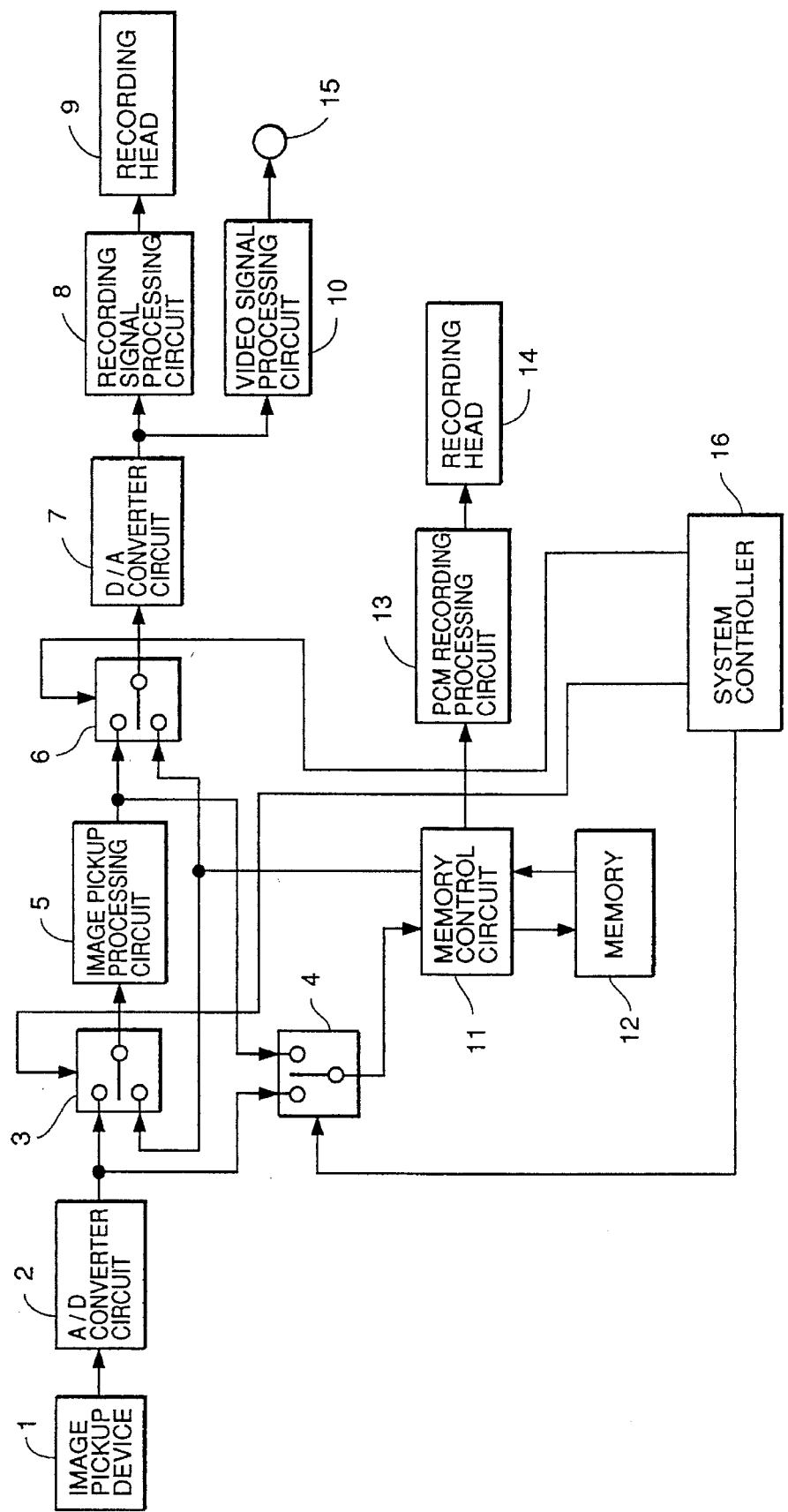
FIG. 1 is a block diagram schematically showing the construction of an image signal recording apparatus in accordance with a first embodiment of the present invention.
Figure 2:
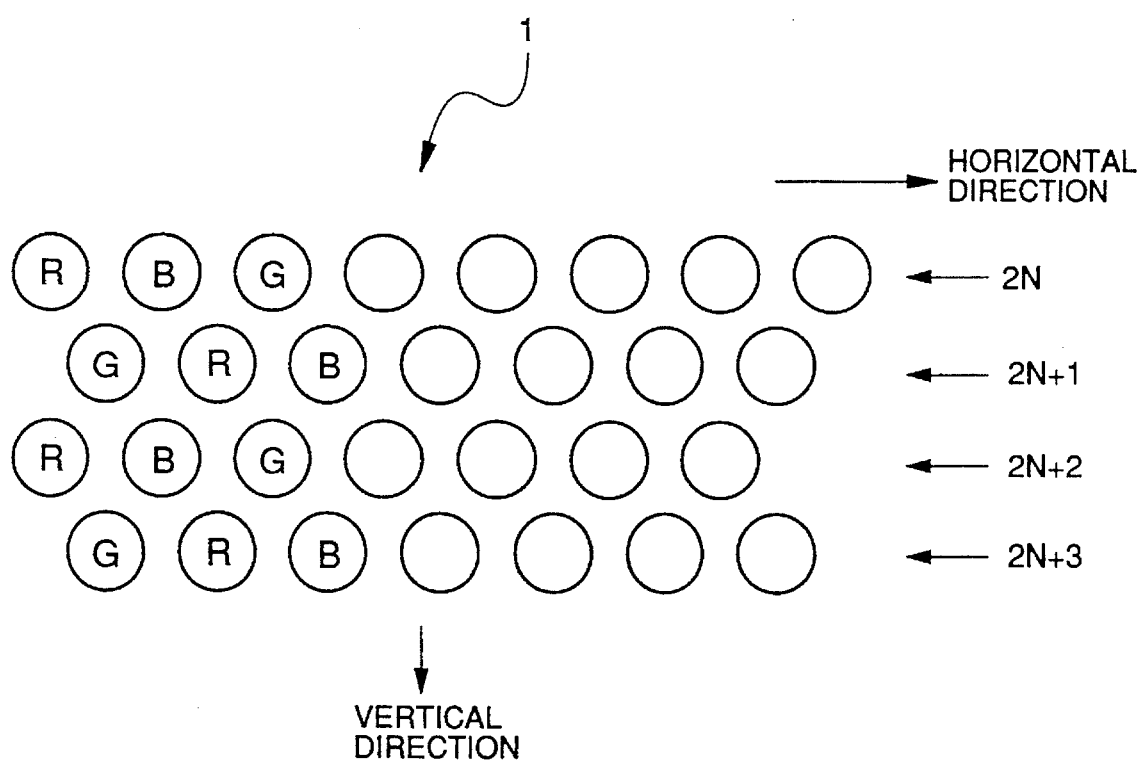
FIG. 2 is a diagram of the arrangement of pixels of the image pickup device of the apparatus shown in FIG. 1.

The preferred embodiments of the present invention will be described below with reference to the accompanying drawings. FIG. 1 is a block diagram of the construction of an embodiment of the present invention in which an image signal recording apparatus in accordance with the present invention is applied to a video movie camera. FIG. 2 is a diagram of a pixel arrangement of an image pickup device 1 of the camera of the apparatus shown in FIG. 1. FIGS. 3 to 7 are block diagrams of signal flows in the apparatus shown in FIG. 1.

Referring to FIG. 1, an optical image of an object is converted into an analog electrical signal by photoelectric transfer in the image pickup device 1 having pixel elements arranged as shown in FIG. 2. As shown in FIG. 2, the image pickup device 1 has a construction such that one horizontal array (row) of pixels is offset relative to adjacent horizontal arrays of pixels by an amount corresponding to ½ the horizontal pitch at which the pixels are arranged. A color filter (not shown) placed on an imaging surface is a stripe filter in which red, green and blue filter elements are arranged so as to be uniform in the vertical direction on the imaging surface.

In forming an image signal corresponding to one horizontal line of an image frame, when electric charge accumulated on an arbitrary one of the horizontal arrays of pixels of the image pickup device 1 is read out, upper and lower adjacent arrays of pixels can be used for interpolation processing to obtain a high-resolution image signal from an image pickup device in which the number of pixels in each horizontal array is comparatively small. Also, a frame image signal can be formed in such a manner that pixel signals read from the image pickup device 1 are stored in a memory and are processed by the interpolation processing. That is, in the case of forming a pixel signal of a (2N+2)th horizontal line of the pixel arrangement shown in FIG. 2, an interpolation pixel signal formed by averaging the sum of a pixel signal of a (2N+1)th horizontal line and a pixel signal of a (2N+3)th horizontal line is added to the pixel signal of the (2N+2)th horizontal line. Also, an interpolation pixel signal formed by averaging the sum of a pixel signal of a 2Nth horizontal line and the pixel signal of the (2N+2)th horizontal line is added to the pixel signal of the (2N+1)th horizontal line. In this manner, a high-resolution image signal can be formed.

An A/D converter circuit 2 is connected to the image pickup device 1. An analog electrical signal generated by the image pickup device 1 is converted into a digital signal by the A/D converter circuit 2. An output terminal of the A/D converter circuit 2 is connected to an image pickup processing circuit 5 through a switch 3. The digital signal or a signal read out from a memory 12 under the control of a memory control circuit 11, as described later, is supplied to the image pickup processing circuit 5 through the switch 3. The image pickup processing circuit 5 outputs a signal as the result of digital image pickup processing of this input signal, i.e., a signal formed of a digital brightness signal and two kinds of digital color-difference signals. An output terminal of the image pickup processing circuit 5 is connected to a D/A converter circuit 7 through a switch 6. The memory control circuit 11 is also connected to the D/A converter circuit 7 through the switch 6. The output signal from the image pickup processing circuit or the signal read out from the memory 12 is selectively supplied to the D/A converter circuit 7 through the switch 6. The D/A converter circuit 7 is connected to a recording signal processing circuit 8 and a video signal output circuit 10. An analog signal converted by the D/A converter circuit 7 is supplied to a recording head 9 through the recording signal processing circuit 8 to be recorded on a recording medium (not shown) and output to an external unit (not shown) such as a monitor unit through the video signal output circuit 10 and an output terminal 15.

The output terminals of the A/D converter circuit 2 and the image pickup processing circuit 5 are also connected to the memory control circuit 11 through a switch 4. The digital signal output by the A/D converter circuit 2 or the output signal from the image pickup processing circuit 5 is selectively supplied to the memory control circuit 11 through the switch 4 and is stored in the memory 12 under the control of the memory control circuit 11. The memory control circuit 11 is connected to a PCM signal processing circuit 13. The digital signal stored in the memory 12 is read out under the control of the memory control circuit 11 to be supplied to the switches 3 and 6 as mentioned above and is also supplied to a recording head 14 through the PCM signal processing circuit 13 to be recorded on an unillustrated recording medium. The connection states of the switches 3, 4, and 6 are controlled by a system controller 16 in accordance with states shown in FIGS. 3 to 7.

A recording operation sequence of the embodiment shown in FIG. 1 will be described below with reference to FIGS. 3 to 7. Briefly, during the operation of moving image pickup recording, the output signal from the image pickup device is processed by the above-mentioned interpolation processing, which is repeated with respect to frame lines, and, during the operation of still image pickup recording, pixel data corresponding to one field is stored in the memory 12, and the interpolation processing is repeated with respect to frame lines of the pixel data stored in the memory 12 to obtain a still image frame signal.

Figure 3:
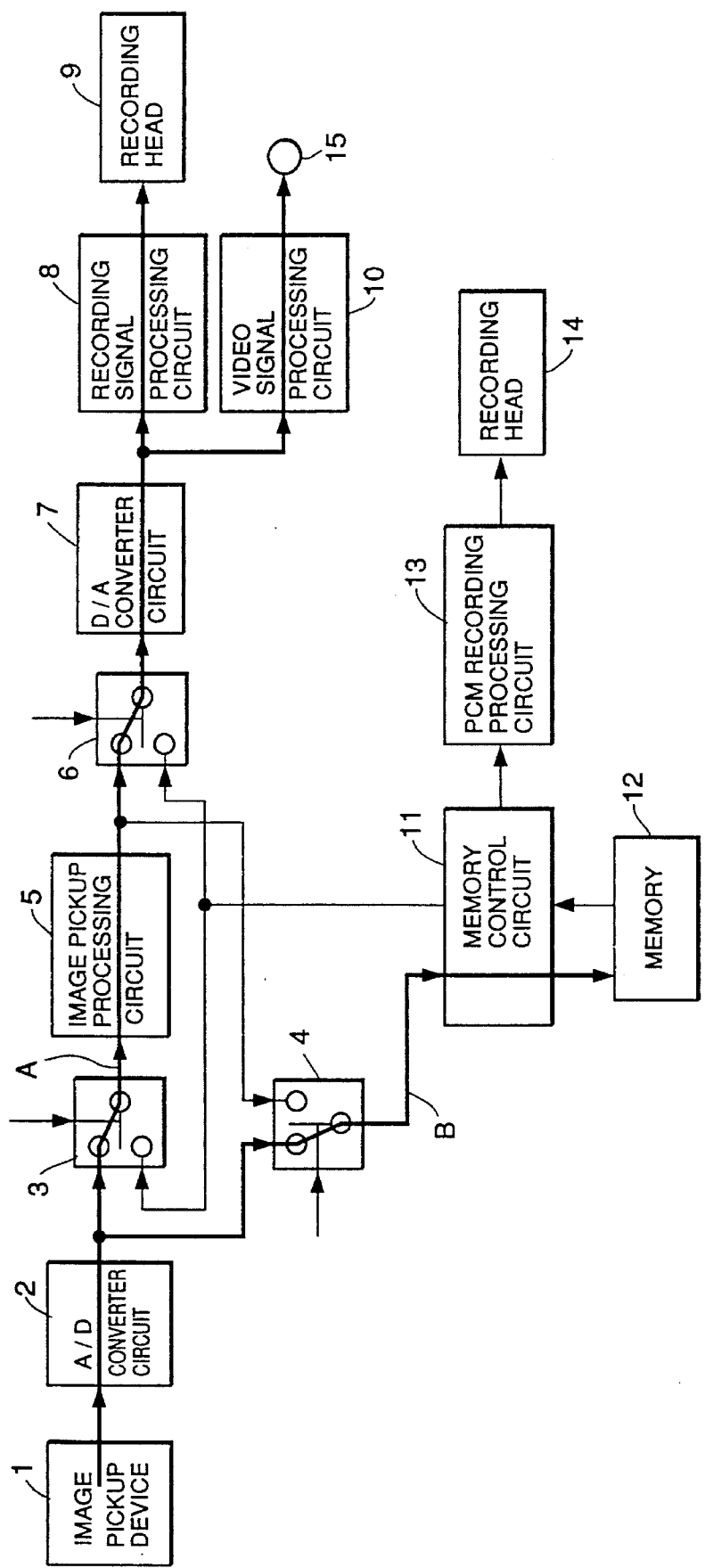
FIG. 3 is a block diagram of signal flows in the apparatus shown in FIG. 1 at the time of photography.

Details of the recording operation will be described below. FIG. 3 shows a state of the apparatus shown in FIG. 1 in which the moving image recording operation is performed and in which the apparatus is ready for the still image pickup recording operation. The output signal from the A/D converter circuit 2 is supplied to the video signal output circuit 10 through the switch 3, the image pickup processing circuit 5, the switch 6, and the D/A converter circuit 7, as indicated by line A in FIG. 3. A video signal is then output from the video signal output circuit 10. The output signal from A/D converter circuit 2 is also supplied to the memory 12 through the switch 4 and the memory control circuit 11, as indicated by line B in FIG. 3. Pixel data corresponding to one field stored in the memory 12 is thereby rewritten.

Figure 4:
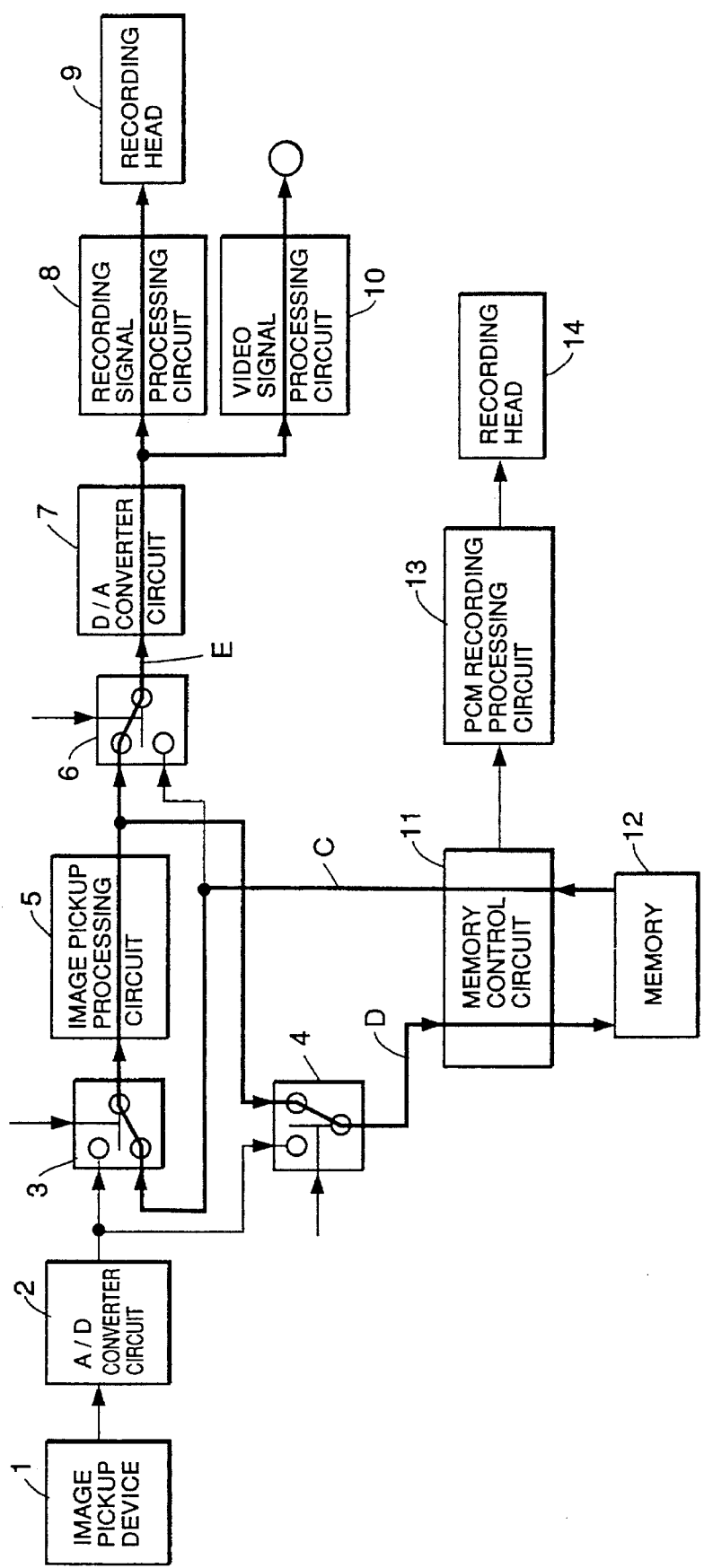
FIG. 4 is a block diagram of signal flows in the apparatus shown in FIG. 1 at the time of frame signal formation.

If an unillustrated trigger button is operated to issue a command to start the still image pickup recording operation, the system controller 16 changes the apparatus shown in FIG. 1 from the state shown in FIG. 3 to the state shown in FIG. 4 in synchronization with the outputting the image signal from the image pickup device 1. Pixel data corresponding to one field immediately before the state of the apparatus is changed is stored in the memory 12. In the state shown in FIG. 4, this pixel data corresponding to one field is repeatedly read out from the memory 12 for a two-field period, and the read-out data is supplied to the image pickup processing circuit 5 through the switch 3, as indicated by line C. A still image frame signal formed of converted brightness and color-difference signals is obtained as an output from the image pickup processing circuit 5 by changing the pixel data reading order with respect to field periods on the basis of the pixel arrangement shown in FIG. 2.

This frame image signal is supplied to the recording head 9 through the switch 6, the D/A converter circuit 7 and the recording signal processing circuit 8 to be recorded on the unillustrated recording medium by the recording head 9, and is also supplied to the video signal output circuit 10 to be output to the unillustrated external unit, as indicated by line E in FIG. 4. This signal is also supplied to the memory control circuit 11 through the switch 4 and is stored again in the memory 12, as indicated by line D in FIG. 4. Pixel data writing in the memory in this case is performed by selecting storage areas of the memory 12 so that the pixel data already stored is not replaced with the pixel data newly stored until reading of the second-field pixel data in the preceding pixel data is completed. However, the capacity of the memory 12 can be reduced by compressing the pixel data by the memory control circuit 11.

Figure 5:
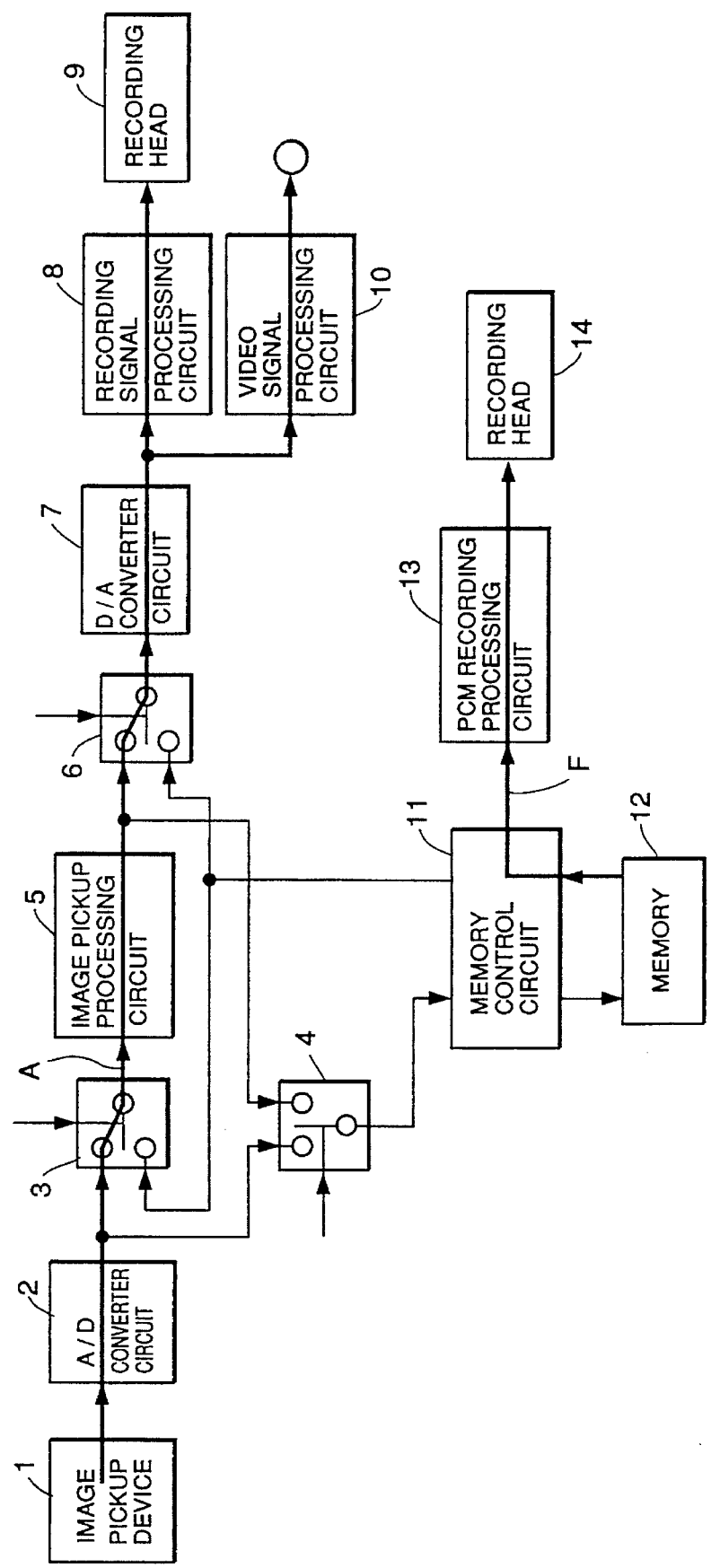
FIG. 5 is a block diagram of signal flows in the apparatus shown in FIG. 1 at the time of recording on a medium.

After the brightness signal and the color-difference signals corresponding to two fields, i.e., one frame, have been stored in the memory 12 in this manner, the system controller 16 changes the state of the apparatus into a state such as that shown in FIG. 5 in synchronization with the timing of outputting the image signal from the image pickup device 1. In the state shown in FIG. 5, the output signal from the A/D converter circuit 2 is supplied through the same line A as in the state shown in FIG. 3, and the brightness signal and the color-difference signals read out from the memory 12 and corresponding to one frame are supplied to the recording head 14 to be recorded on the recording medium while codes for error correction or the like are added thereto in the PCM signal processing circuit 13, as indicated by line F. Thus, by the sequence of processing operations shown in FIGS. 3 to 5, a still image signal corresponding to one frame is recorded on the recording medium in a digital manner.

Figure 6:
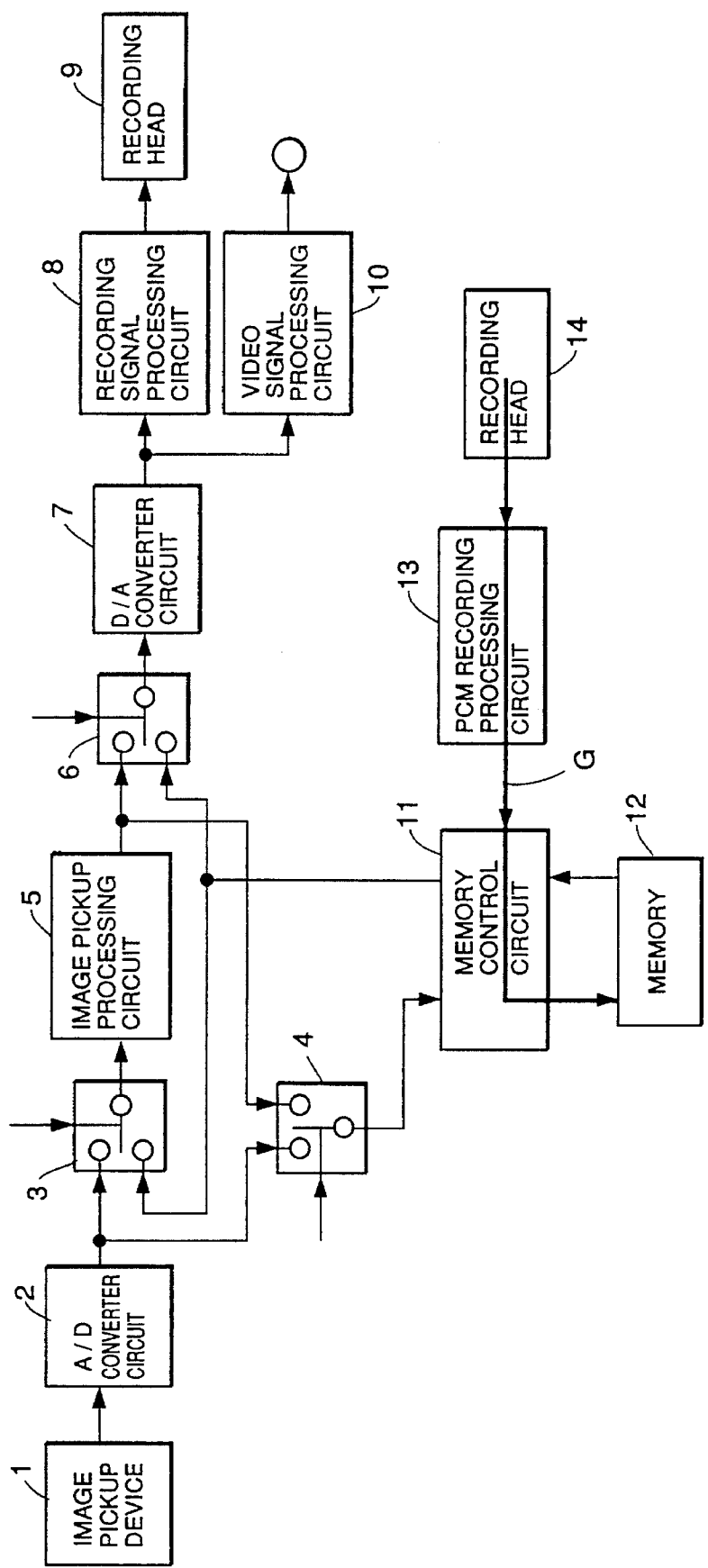
FIG. 6 is a block diagram of a signal flow in the apparatus shown in FIG. 1 at the time of reading from the medium.
Figure 7:
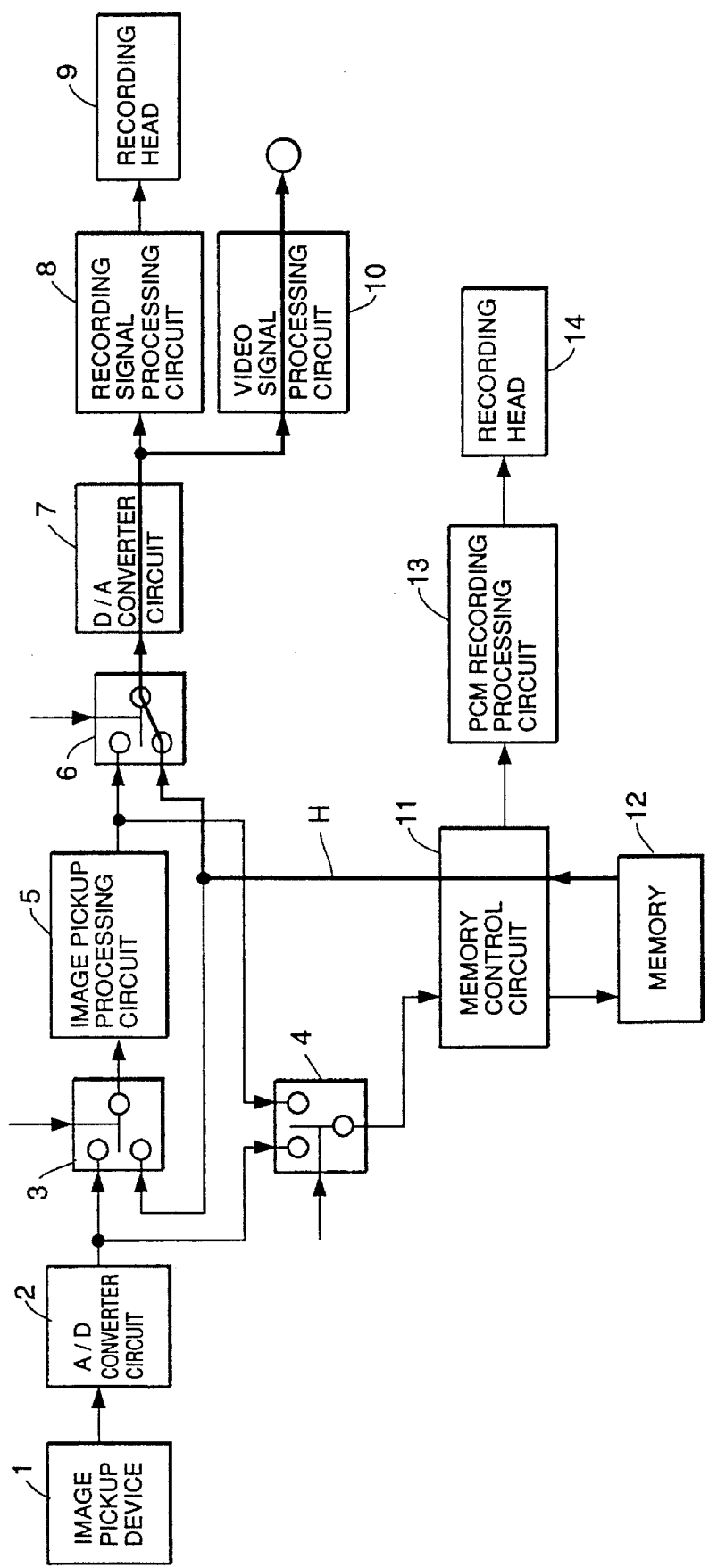
FIG. 7 is a block diagram of a flow of a signal reproduced and output in the apparatus shown in FIG. 1.

A reproducing operation sequence of the apparatus shown in FIG. 1 will now be described below with reference to FIGS. 6 and 7. When the reproducing operation is performed, the system controller 16 first makes the apparatus shown in FIG. 1 operate in the state shown in FIG. 6. A digital still image signal is thereby read from the recording medium by the recording head 14, processed for error correction or the like by the PCM signal processing circuit 13, and stored in the memory 12 under the control of the memory control circuit 11, as indicated by line G in FIG. 6. Thereafter, the system controller 16 changes the apparatus shown in FIG. 1 from the state shown in FIG. 6 to the state shown in FIG. 7. In the state shown in FIG. 7, as indicated by line H, a brightness signal and color-difference signals read out from the memory 12 are supplied to the D/A converter circuit 7 through the switch 6 to be converted into analog signals, which are output to the unillustrated external unit as an output from the video signal output circuit 10.

Thus, the apparatus in accordance with the above-described embodiment is arranged so that an image signal corresponding to one field, output from the image pickup device 1 having a construction such that each horizontal array of pixels (row) is offset relative to adjacent horizontal arrays of pixels by an amount corresponding to ½ the horizontal pitch at which the pixels are arranged, is stored in the memory 12, and an image signal corresponding to one frame is formed from this image signal corresponding to one field and is recorded on the recording medium. Thus, an image signal corresponding to one frame can easily be recorded and reproduced in a digital form.

Figure 8:
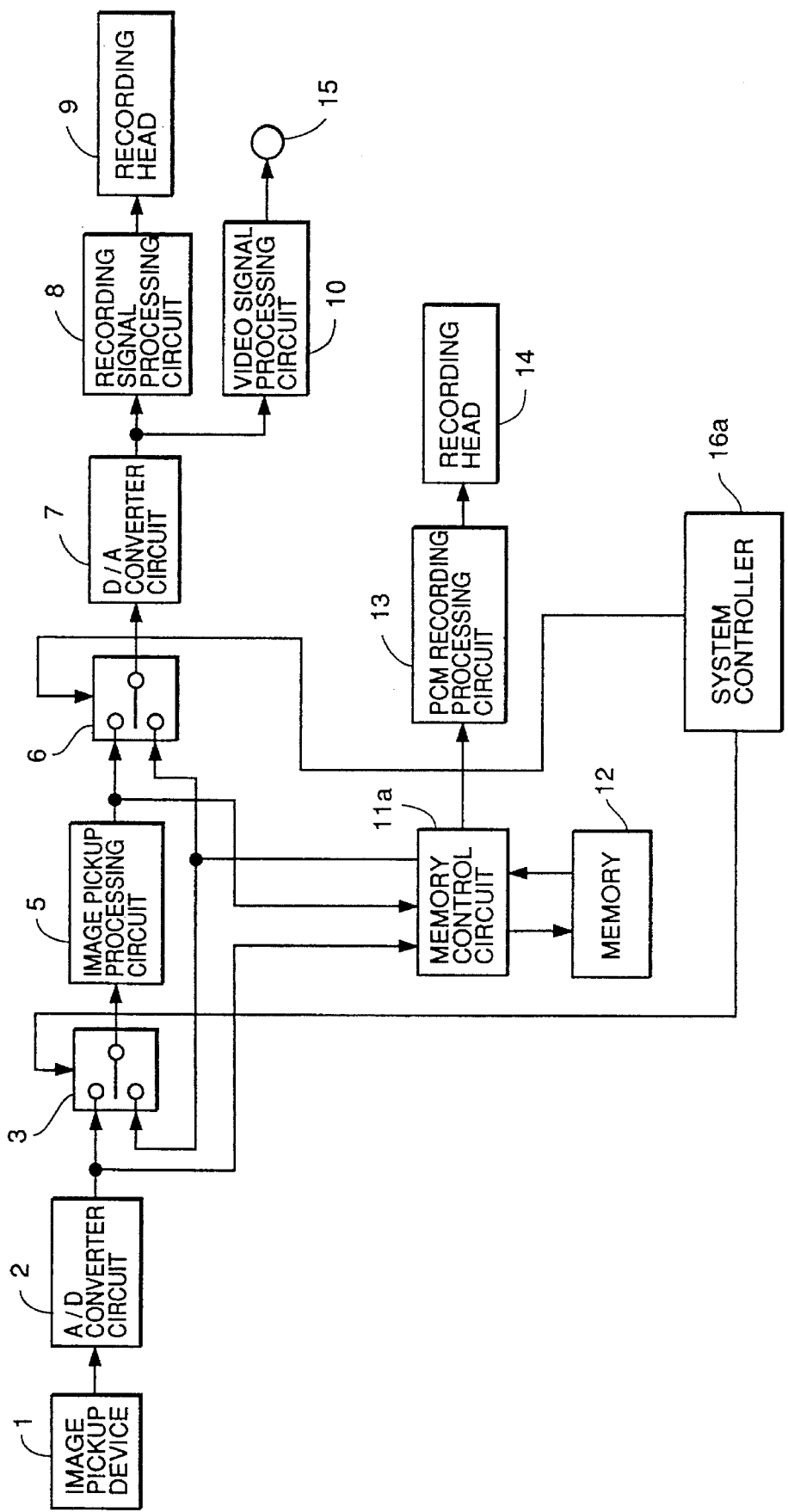
FIG. 8 is a block diagram of an example of a modification of the first embodiment.

FIG. 8 shows an example of a modification of the first embodiment shown in FIG. 1. In this example, a memory control circuit 11a has two inputs, and a signal output from an A/D converter circuit 2 and a signal output from an image pickup processing circuit 5 can be stored in the memory 12 by being combined with each other in the memory control circuit 11a. That is, the operation of storing pixel data obtained by digitizing the signal output from the image pickup device 1 in the state shown in FIG. 3 and the operating of storing the brightness and color-difference signals of the first field output from the image pickup processing circuit 5 in the state shown in FIG. 4 can be performed simultaneously. Therefore, while the same image signal is output for a three-field period to obtain a still image frame signal in the first embodiment shown in FIG. 1, the operation of outputting the same image signal for two field periods will suffice to achieve the same effect in this modified example. It is therefore possible to reduce the influence upon the resulting moving image in a case where the movement of the imaged object is fast.

Figure 9:
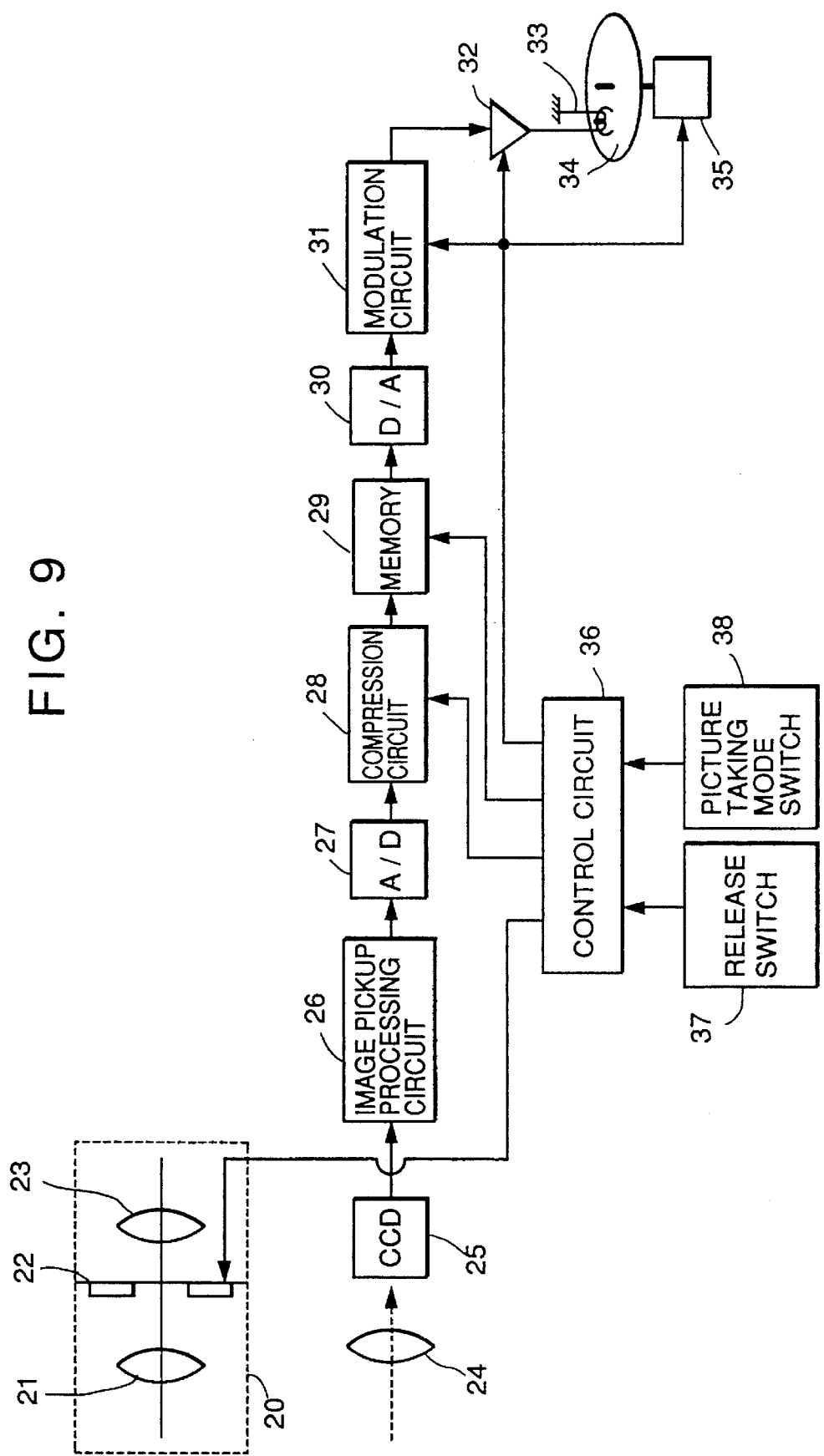
FIG. 9 is a block diagram schematically showing the construction of an electronic still camera in accordance with a second embodiment of the invention.
Figure 10A:
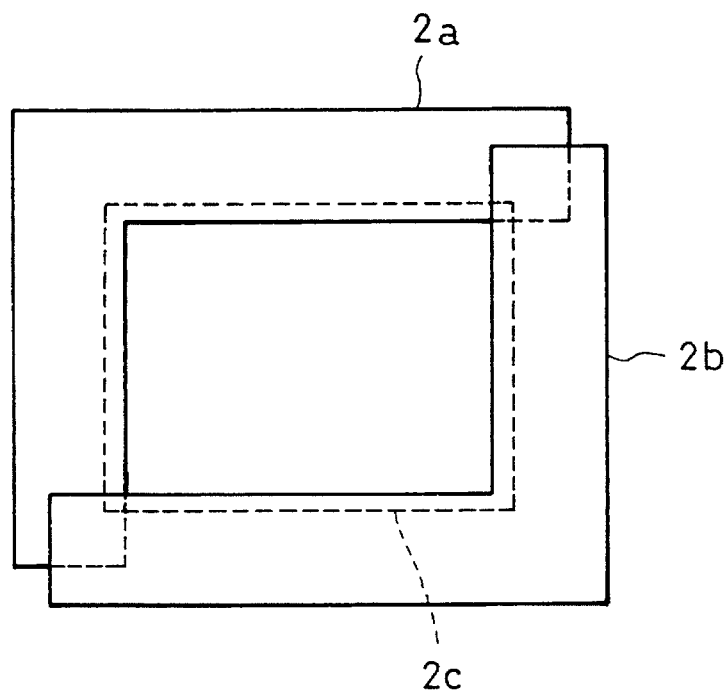
FIGS. 10(a) and 10(b) are front views of a field frame of the camera shown in FIG. 9.
Figure 10B:
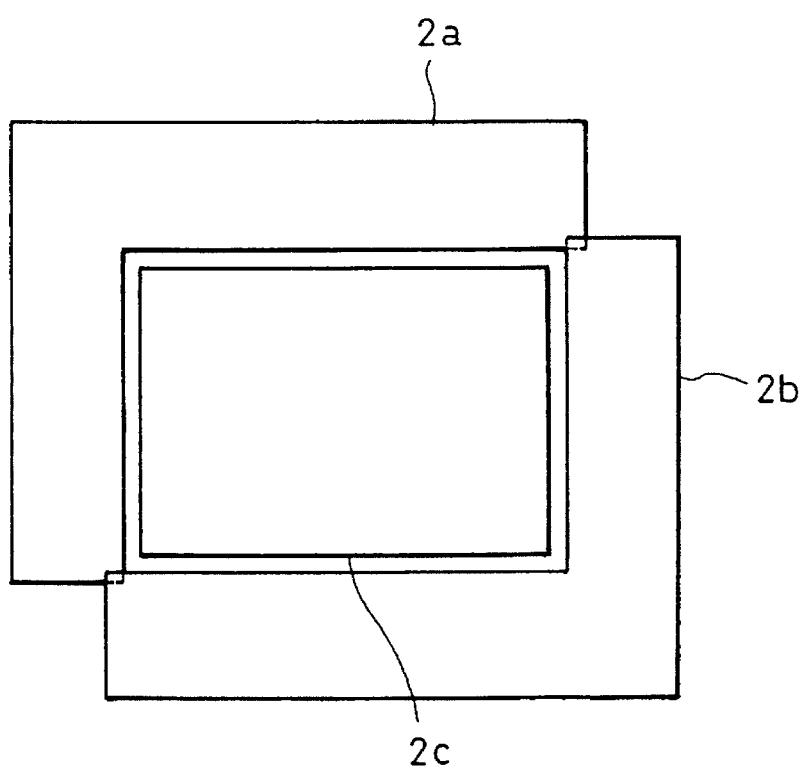
Figure 11:
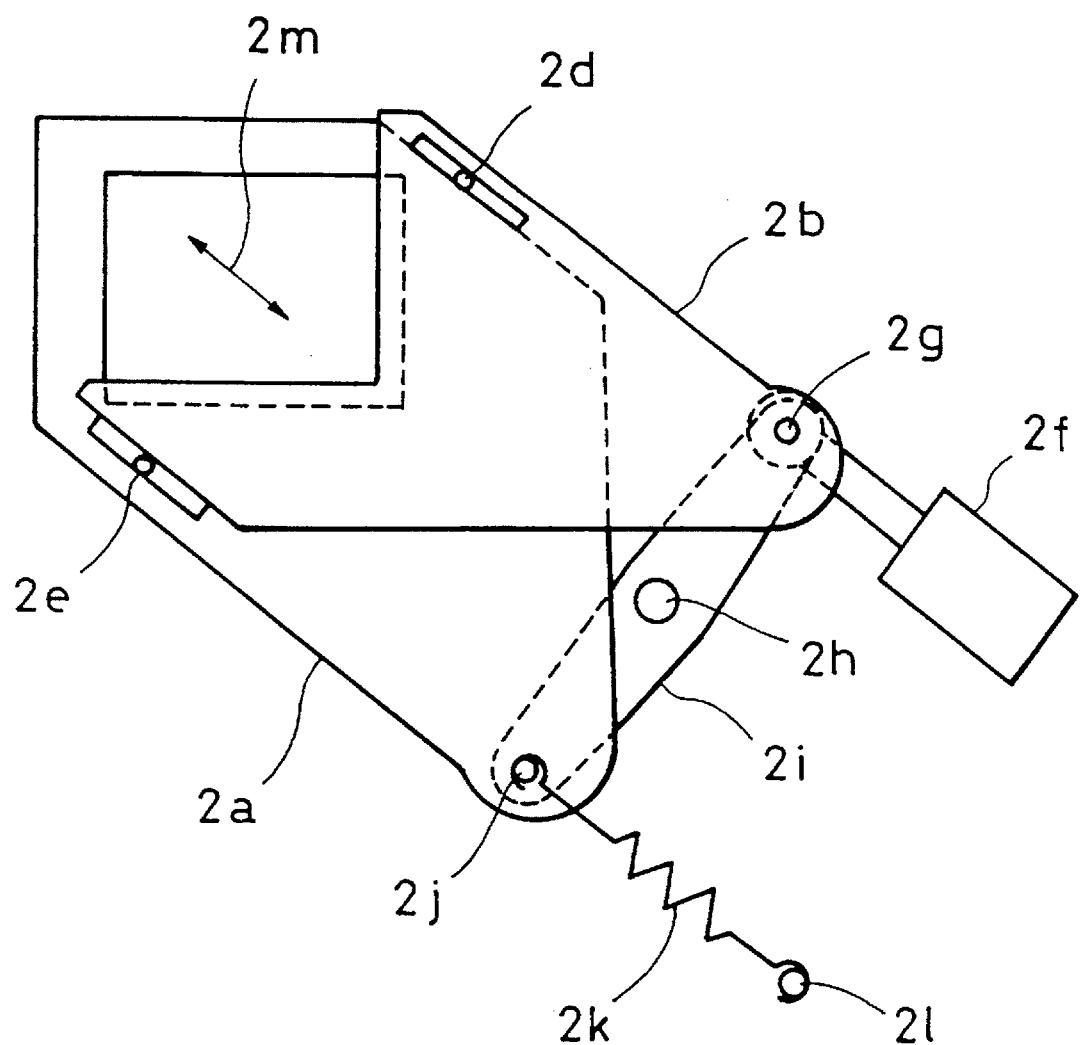
FIG. 11 is a diagram of the construction of a mechanism for driving the field frame shown in FIG. 10.
Figure 12:
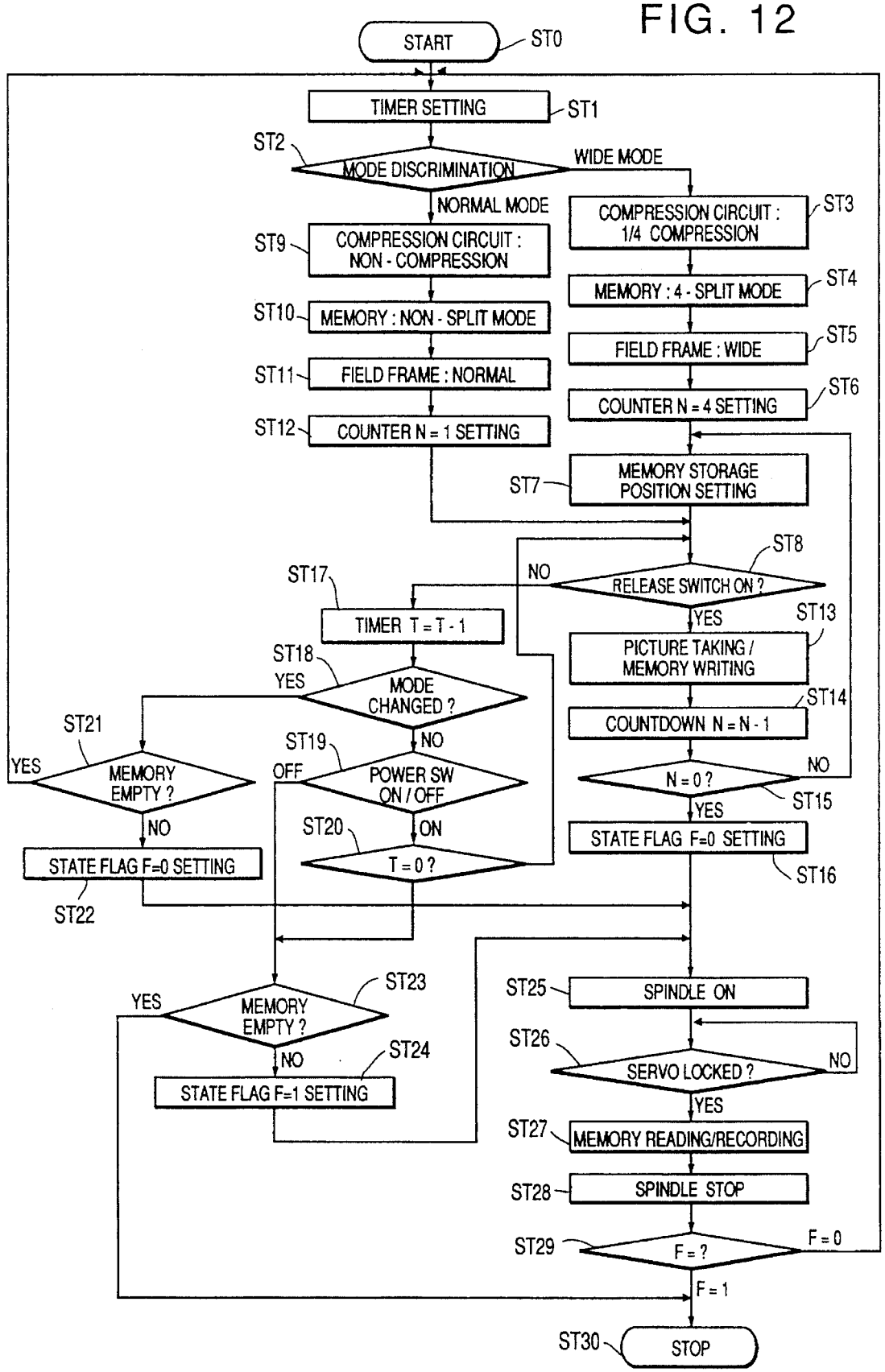
FIG. 12 is a flowchart of the operation of the second embodiment.

A second embodiment of the present invention will now be described. FIG. 9 is a block diagram of the construction of an electronic still camera to which an image signal recording apparatus in accordance with the second embodiment of the present invention is applied, FIGS. 10(a) and 10(b) are front views of a finder field frame of the electronic still camera shown in FIG. 9, FIG. 11 is a diagram of the construction of a mechanism for driving the finder field frame of the electronic still camera shown in FIG. 10, and FIG. 12 is a flowchart of the operation of the second embodiment of the present invention shown in FIG. 9. The electronic still camera shown in FIG. 9 is arranged to have a photographable area twice the ordinary photographable area in both the vertical and horizontal directions.

In the electronic still camera shown in FIG. 9, an optical finder 20 is constituted of an objective 21, a field frame 22, and an ocular 23. The field frame 22 is formed of a pair of frame members 2a and 2b, as shown in FIGS. 10(a) and 10(b). A field line 2c formed on a glass plate or the like (not shown) designates the actual recording area. With respect to ordinary still cameras, it is desirable that any object viewed in the field should be recorded entirely. In this embodiment, at the time or ordinary photography, the frame members 2a and 2b are controlled so that the area surrounded by the frame members 2a and 2b is smaller than the fame of the field line 2c, as shown in FIG. 10(a), in which the field line 2c is indicated by the broken line. In a wide photography mode, the frame members 2a and 2b are controlled so that, as shown in FIG. 10(b), the area surrounded by the frame members 2a and 2b is greater than the frame of the field line 2c indicated by the solid line. In this case, four sides of the actually-recorded area can be confirmed by a photographer.

A mechanism for driving the frame members 2a and 2b will be described below with reference to FIG. 11. The frame members 2a and 2b can be moved in oblique directions 2m along a pair of guide pins 2d and 2e. The frame member 2b is supported at a pin 2g on a plunger 2f. The frame member 2a has a pin 2j connected to a supporting point 21 through a spring 2k. The pins 2g and 2j are connected through an arm 2i which is rotatably supported on a supporting point 2h. Consequently, the frame members 2a and 2b can be moved in oblique directions 2m by the plunger 2f and the spring 2k to change the size of the field as shown in FIGS. 10(a) and 10(b).

Referring back to FIG. 9, the construction of the electronic still camera will be described below.

The electronic still camera shown in FIG. 9 has a photographing lens 24, an image pickup device 25 formed of a charge coupled device (CCD) or the like, an image pickup processing circuit 26, an A/D converter 27, a compression circuit 28, a memory 29, a D/A converter 30, a modulation circuit 31, a recording amplifier 32, and a magnetic head 33. These components are connected in this order. The magnetic head 33 is capable of recording on a magnetic disk 34 rotated by a spindle motor 35. A control circuit 36 is connected to the optical finder 20, the compression circuit 28, the memory 29, the modulation circuit 31, the recording amplifier 32 and the spindle motor 35. A release switch 37 and a photography mode switch 38 for selecting the ordinary photography mode or the wide photography mode are connected to the control circuit 36.

An image of an object is imaged on an image pickup surface of the image pickup device 25 by the photographing lens 24. The object image formed on the image pickup surface of the image pickup device 25 is converted into an image signal by photoelectric transfer. This image signal is supplied to the image pickup processing circuit 26 and is processed therein by analog image pickup processing. The image signal is then converted into a digital signal by the A/D converter 17. The amount of information of the converted digital signal is compressed to ¼ of its original amount by the compression circuit 28 when the wide photography mode is selected, and the signal is thereafter supplied to the memory 29. In the memory 29, digital image signals obtained in the above-described manner and corresponding to four object images are combined by being successively stored in different memory areas in the memory 29.

The digital image signals stored and combined in the memory 29 as described above are read out from the memory 29 under the control of the control circuit 36, converted into an analog image signal by the D/A converter 30, modulated by the modulation circuit 31, and recorded on the magnetic disk 34 through the recording amplifier 32 and the magnetic head 33. The magnetic disk 34 is rotated by the spindle motor 35 controlled by the control circuit 36. The magnetic head 33 is movable in the radial direction of the magnetic disk 34.

The control circuit 36 controls the operations of the field frame 22 of the optical finder 20, the compression circuit 28, the memory 29, the modulation circuit 31, the recording amplifier 32 and the spindle motor 35 according to the operations of the release switch 37 and the photography mode switch 38.

The control operation of the control circuit 36 in this embodiment will be described below with reference to the flowchart shown in FIG. 12. In step ST0, a sequence of operations is started. In step ST1, a time-out time T is set in an internal timer of the control circuit 36. In step ST2, the set state of the photography mode switch 38 is discriminated. If the wide photography mode is selected, the process proceeds to step ST3 and other subsequent steps. If the ordinary photography mode is selected, the process proceeds to step ST9 and other subsequent steps.

When the wide photography mode is selected, the information compression ratio of the compression circuit 28 is set to ¼ (step ST3), the memory 29 is set in the 4-split storage mode wherein the storage area is divided into four areas and information is separately stored in each divided storage area (step ST4), and the field frame 22 is set to the position in accordance with the wide photography mode (step ST5). A value N of a counter in the control circuit 36 indicating the number of split image areas is set to "4" (step ST6), and the storage positions of the 4-split storage areas of the memory 29 are set on the basis of this counter value N (step ST7). The setting for the wide photography mode is thereby completed and the process proceeds to step ST8.

When the ordinary photography mode is selected, the information compression ratio of the compression circuit 28 is set so that information is not compressed (step ST9), the memory 29 is set in the non-split storage mode wherein information is stored without dividing the storage area (step ST10), and the field frame 22 is set to the position in accordance with the ordinary photography mode (step ST11). The value N of a counter in the control circuit 36 indicating the number of split image areas is set to "1" (step ST12). The setting for the ordinary photography mode is thereby completed and the process proceeds to step ST8.

If, in step ST8, a change of the release switch 37 into the on state is detected, the process proceeds to step ST13 and other subsequent steps, and the signal output from the image pickup device 25 is supplied to the compression circuit 28 through the image pickup processing circuit 26 and the A/D converter 27, compressed at the compression ratio set in the compression circuit 28, and stored in the storage area of the memory 29 in accordance with values designated with the counter value N indicating the number of split image areas. In step ST14, the counter value N indicating the number of split image areas is decremented by one. In step ST15, a determination is made as to whether the value N is "0". If the value N is not "0", the process returns to step ST7 for the next picture taking operation. If the value N of the counter is "0" in step ST15, the process proceeds to step ST16, a state flag F provided in the control circuit 36 is set to "0" and the process proceeds to step ST25 and other subsequent steps.

If a change of the release switch 37 into the on state is not detected in step ST8, the process branches off to step ST17 and other subsequent steps. The time-out time T set in the internal timer provided in the control circuit 36 is first discriminated by one (step ST17), and a determination is made as to whether the photography mode has been changed (step ST18). If the photography mode has been changed, the process proceeds to step ST21. If the photography mode is unchanged, the process branches off to step ST19 and other subsequent steps. In step ST21, a determination is made as to whether any image data exists in the memory 29. If image data exists there, the state flag F is set to "0" in step ST22 and the process proceeds to step ST25 and other subsequent steps. If there is no image data in the memory, the process returns to step ST1.

In step ST19, an on or off state of an unillustrated power switch is discriminated. If the power switch is in the on state, a determination is made in step ST20 as to whether the time-out time T is "0". If the time-out time T is not "0" the process returns to step ST8. Accordingly, if a change of the release switch into the on state is not detected, the operations of steps ST17 to ST20→step ST8 are repeated. If the off state of the power switch is detected in step ST19, and if the time-out time T is "0" in step ST20, the process proceeds to step ST23 and other subsequent steps and a determination is made as to whether any image data exists in the memory 29. If image data exists there, the state flag F is set to "1" in step ST24 and the process proceeds to step ST25 and other subsequent steps If there is no data present in step ST23, the process is terminated.

In step ST25, the spindle motor 35 is rotated. If, in step ST26, servo locking of the rotation of the spindle motor 35 is detected, the process proceeds to step ST27 and others subsequent steps. In step ST27, image data stored in the memory 29 is read out and recorded on the magnetic disk 34. In step ST28, the rotation of the spindle motor 35 is stopped. If the state flag F is "0" in step ST29, the process returns to step ST1. If the state flag F is "1", the process is terminated.

In the above-described embodiment, a wide image can be recorded by using a picture taking lens having a comparatively long focal length, because, in the wide photography mode, information corresponding to the object image is recorded by dividing the image area into four and compressing the amount of information to ¼ of the uncompressed amount. Also, a photographer can easily grasp the connection between the four split image areas because the finder field frame is greater than the actual recordable area in the wide photography mode, as shown in FIG. 10(b).

Figure 13:
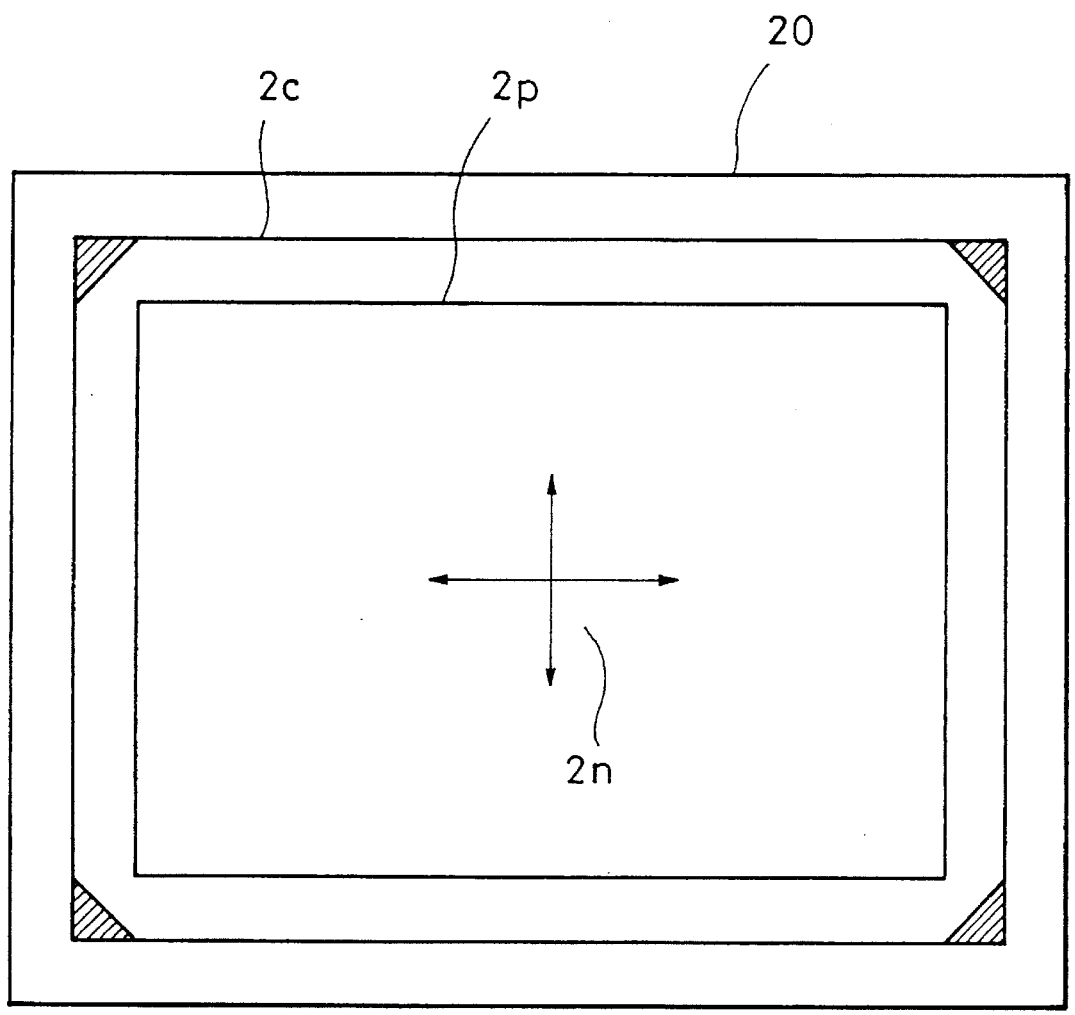
FIGS. 13 to 15 are diagrams of a field frame in an example of a modification of the second embodiment.
Figure 14:
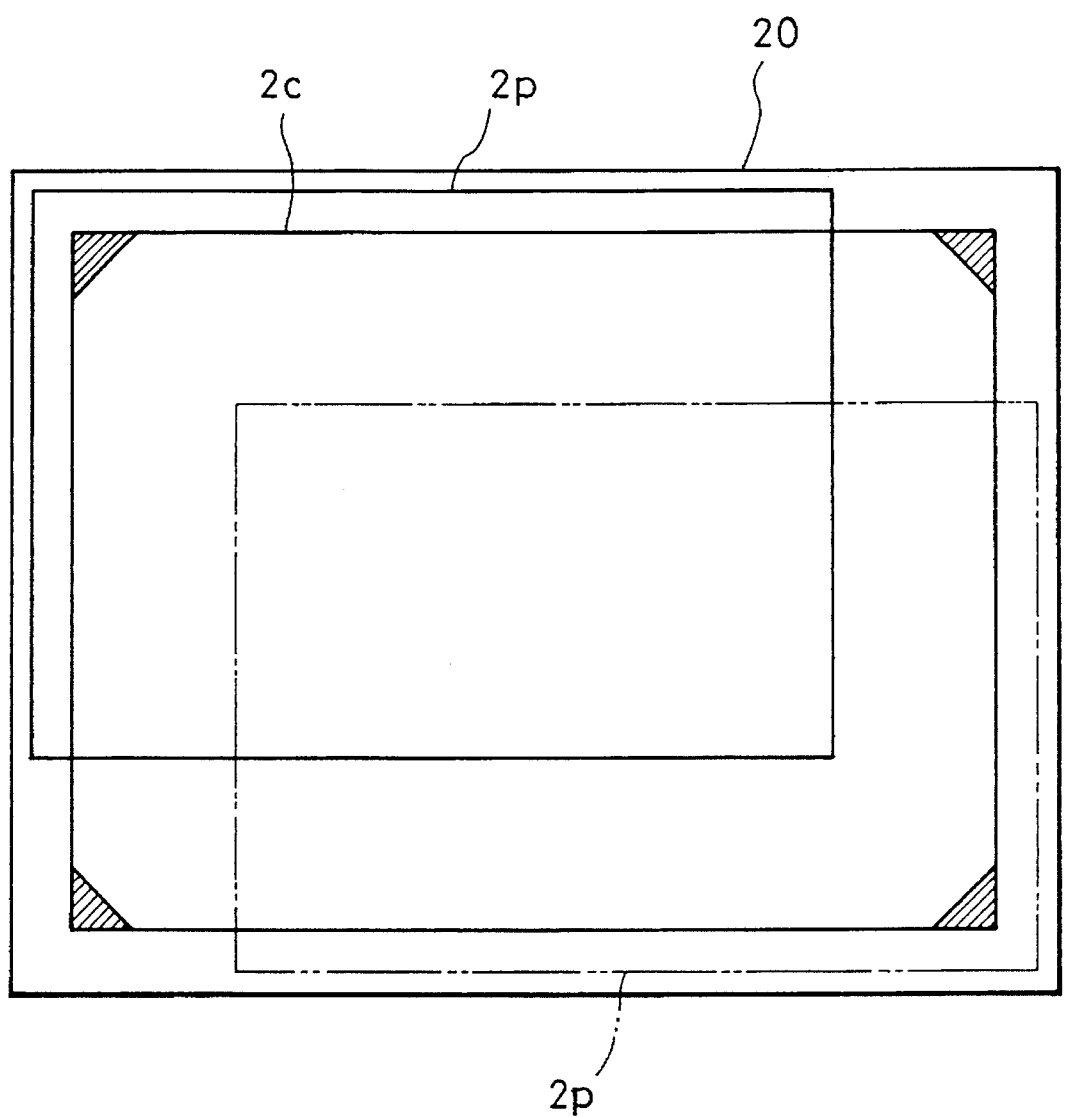
Figure 15:
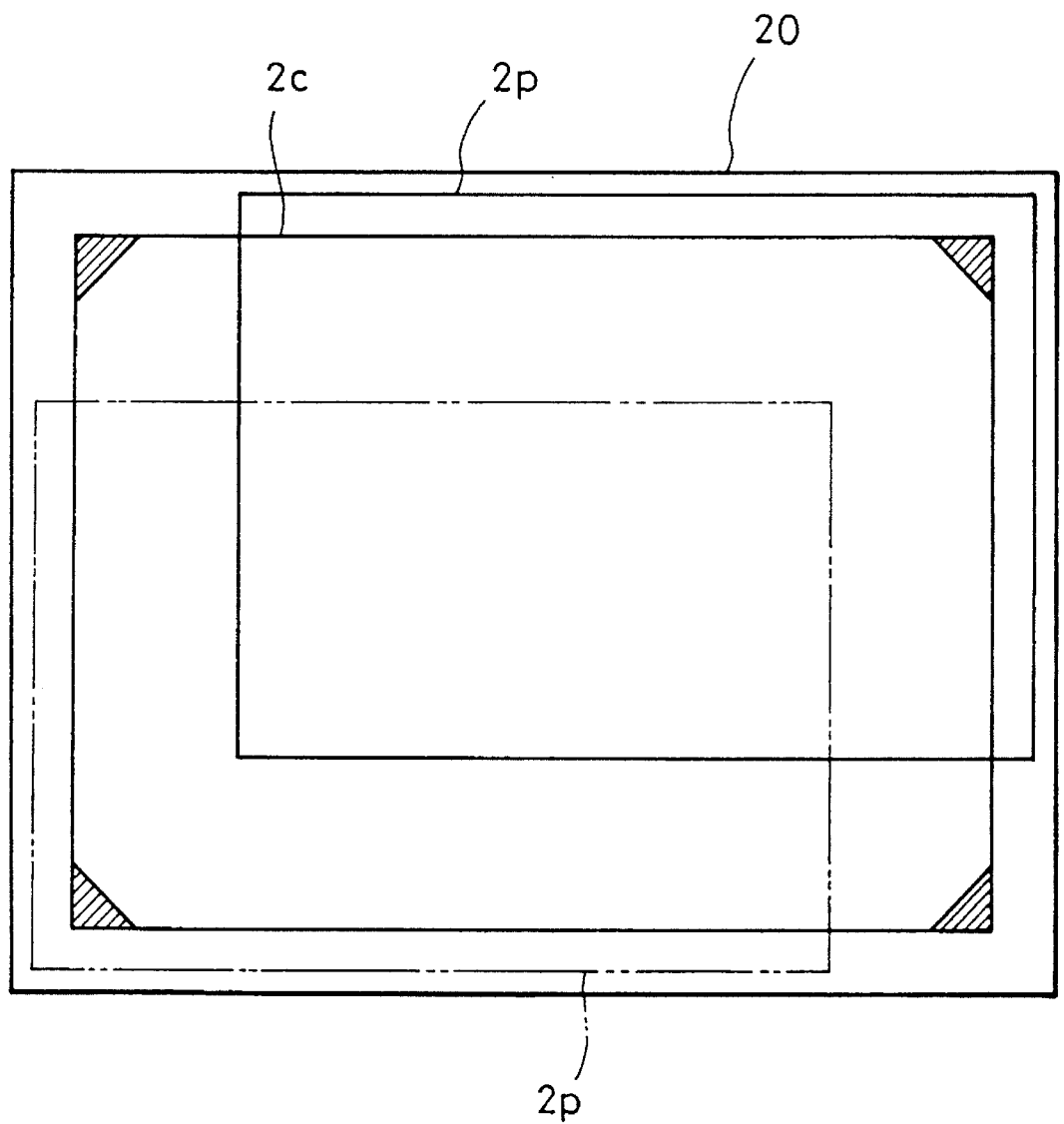
Figure 16:
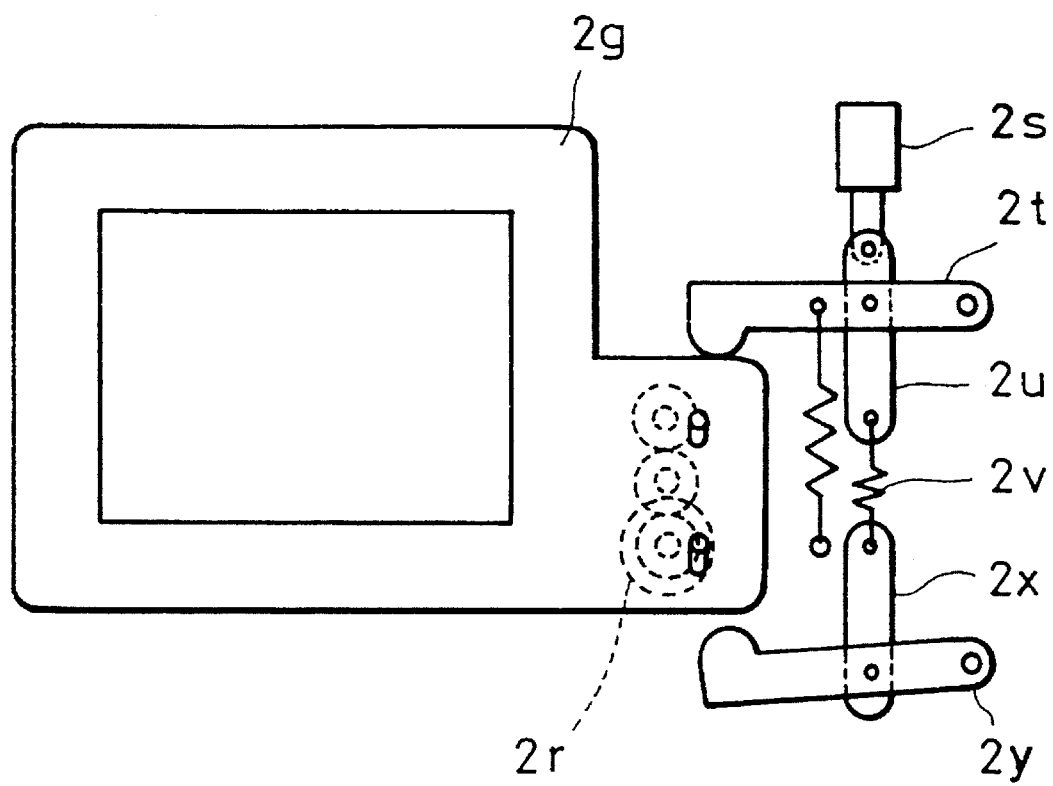
FIG. 16 is a diagram of a mechanism for driving the field frame shown in FIGS. 13 to 15.

An example of a modification of the second embodiment will be described below. FIGS. 13 to 15 are diagrams of a finder field frame, and FIG. 16 is a diagram of a drive mechanism for moving the field frame shown in FIGS. 13 to 15. As shown in FIG. 13, a field frame 2p is movable in four directions as indicated by arrows 2n, i.e., vertical and horizontal directions, and four marks are provided at four corners of a field line 2c. The field frame 2p is movable between a central position defined as shown in FIG. 13 and positions shifted therefrom in vertical and horizontal directions, defined as indicated by solid and broken lines in FIGS. 14 and 15. The moved position of the field frame 2p is selected so that two of the four sides of the field line 2c and one of the four corner marks can be seen simultaneously.

The drive mechanism for moving the field frame 2p will be described below with reference to FIG. 16. There are successively connected, in a vertical direction, a plunger 2s, a guide plate 2u, a stopper 2t, a spring 2v, a guide plate 2x and a stopper 2y. If the plunger 2s is moved in a vertical direction, a finder frame 2g is moved in a vertical direction by the stopper 2t or 2y. The extent of movement of the finder frame 2g thus is limited by the stoppers 2t and 2y. The finder frame 2g is also moved in a horizontal direction by a step motor 2r.

Accordingly, in this modified example as well, it is possible to easily grasp the connection between four sides of split image areas in the case of taking a picture by dividing the image area into four. The number of split image areas in accordance with the present invention is not limited to four. For example, an image may be recorded by dividing the image area into 3×3, i.e., 9 areas. Also, image signals corresponding to, for example, two laterally-arranged areas among 4-split image areas may be recorded by shifting them to an image center on the memory to obtain a horizontally-extending panoramic image. Further, image signals corresponding to two vertically-arranged areas may be recorded by shifting them to an image center in the memory to obtain a vertically-extending panoramic image. Accordingly, this effect can be increased if the number of split image areas is increased. Also, the present invention is not limited to arrangements for recording an image signal in an analog form on magnetic disk 37, and an image signal may instead be recorded in a digital form on the medium.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image signal processor for processing an image signal corresponding to an object image, comprising:

an image pickup device having a plurality of sensor sites, each of which corresponds to one of a plurality of kind of color components different from one another, said plurality of sensor sites generating a plurality of pixel signals, each of which corresponds to one of the plurality of kinds of color components, by photoelectrically converting the object image;

pixel signal processing means for forming a brightness signal and a color signal by using the plurality of pixel signals generated by the plurality of sensor sites, and outputting the brightness signal and the color signal;

memory means for storing one of either (a) the plurality of pixel signals generated by the plurality of sensor sites without the intermediary of said pixel signal processing means or (b) the brightness signal and the color signal output from said pixel signal processing means;

supply means for supplying one of either (a) the plurality of pixel signals generated by the plurality of sensor sites directly or (b) the signals stored in said memory means to said pixel signal processing means;

selective output means for inputting one of either (a) the plurality of pixel signals generated by the plurality of sensor sites without the intermediary of said pixel signal processing means or (b) the brightness signal and the color signal output from said pixel signal processing means, and supplying to said memory means one of either the plurality of pixel signals or (b) the brightness signal and the color signal input by said selective output means;

output means for outputting to a signal utilization device the brightness signal and the color signal output from said pixel signal processing means; and control means having a moving image outputting mode and a still image outputting mode, and controlling said supply means and said selective output means so that said supply means supplies the plurality of pixel signals generated by the plurality of sensor sites directly to said pixel signal processing means and said selective output means inputs the plurality of pixel signals generated by the plurality of sensor sites without the intermediary of said pixel signal processing means and supplies the input plurality of pixel signals to said memory means in the moving image outputting mode, while said supply means supplies the signals stored in said memory means to said pixel signal processing means and said selective output means inputs the brightness signal and the color signal output from said pixel signal processing means and supplies the input brightness signal and the input color signal to said memory means in the still image mode.

2. An image signal processor according to claim 1, further comprising recording means for recording on a recording medium the brightness signal and the color signal output from said output means.

3. An image signal processor for processing an image signal corresponding to an object image, comprising:

an image pickup device having a plurality of sensor sites, each of which corresponds to one of a plurality of kinds of color components different from one another, said plurality of sensor sites generating a plurality of pixel signals, each of which corresponds to one of the plurality of kinds of color components, by photoelectrically converting the object image;

analog/digital conversion means for converting the plurality of pixel signals generated by the plurality of sensor sites into a plurality of pixel data, and outputting the plurality of pixel data;

pixel data processing means for forming brightness data and color data by using the plurality of pixel data output from said analog/digital conversion means, and outputting the brightness data and the color data;

memory means for storing one of either (a) the plurality of pixel data output from said analog/digital conversion means without the intermediary of said pixel signal processing means or (b) the brightness data and the color data output from said pixel data processing means;

data supply means for supplying one of either (a) the plurality of pixel data output from said analog/digital conversion means directly or (b) the digital data stored in said memory means to said pixel data processing means;

selective data output means for inputting one of either (a) the plurality of pixel data output from said analog/digital conversion means without the intermediary of said pixel data processing means or (b) the brightness data and the color data output from said pixel data processing means, and supplying to said memory means one of either (a) the plurality of pixel data or (b) the brightness data and the color data input by said selective data output means;

data output means for outputting to a signal utilization device the brightness data and the color data output from said pixel data processing means; and controlling means having a moving image outputting mode and a still image outputting mode, and controlling said data supply means and said selective data output means so that said data supply means supplies the plurality of pixel data output from said analog/digital conversion means directly to said pixel data processing means and said selective data output means inputs the plurality of pixel data output from said analog/digital conversion means without the intermediary of said pixel data processing means and supplies the input plurality of pixel data to said memory means in the moving image outputting mode, while said data supply means supplies the digital data stored in said memory means to said pixel data processing means and said selective data output means inputs the brightness data and the color data output form said pixel data processing means and supplies the input brightness data and the input color data to said memory means.

4. An image signal processor according to claim 3, further comprising:

digital analog conversion means arranged to be supplied with the digital data output from said data output means, for forming an analog signal by digital/analog conversion of the supplied digital data, and outputting the analog signal; and analog recording means for recording on a recording medium the analog signal output from said digital/analog conversion means in an analog manner.

5. An image signal processor according to claim 3, further comprising digital recording means for recording on a recording medium one of either (a) the plurality of pixel data or (b) the brightness data and the color data stored in said memory means, in a digital manner.

6. An image signal processor according to claim 3, further comprising recording means for recording on a recording medium the signals output from said output means.

* * * * *

UNITED STATES PATENT AND TRADEMARK OFFICE
CERTIFICATE OF CORRECTION

PATENT NO. : 5,592,575
DATED : January 7, 1997
INVENTOR(S) : SABURO NAKAZATO

Page 1 of 2

It is certified that error appears in the above-indentified patent and that said Letters Patent is hereby corrected as shown below:

COLUMN 1

Line 14, "apparatus-capable" should read --apparatus capable--.

COLUMN 5

Line 58, Close up right margin;
Line 59, Close up right margin.

COLUMN 6

Line 66, "operating" should read --operation--.

COLUMN 7

Line 32, "or" should read --of--;
Line 34, "fame" should read --frame--.

COLUMN 9

Line 42, ""0"" should read --"0", the--;
Line 52, "steps If" should read --steps. If--;
Line 56, "others" should read --other--.

UNITED STATES PATENT AND TRADEMARK OFFICE
CERTIFICATE OF CORRECTION

PATENT NO. : 5,592,575

DATED : January 7, 1997

INVENTOR(S) : SABURO NAKAZATO

It is certified that error appears in the above-indentified patent and that said Letters Patent is hereby corrected as shown below:

COLUMN 11

Line 23, "either the" should read --either (a) the--.

Signed and Sealed this

Eighth Day of July, 1997

Attest:

BRUCE LEHMAN

Attesting Officer

Commissioner of Patents and Trademarks